United States Patent
Wingate

[11] 3,900,261
[45] Aug. 19, 1975

[54] ELECTRONIC RANGE FINDER

[75] Inventor: Sidney Wingate, Concord, Mass.

[73] Assignee: Transitek Corporation, Concord, Mass.

[22] Filed: Mar. 18, 1974

[21] Appl. No.: 452,049

[52] U.S. Cl. .................. 356/5; 356/4; 343/17.2; 343/17.1; 343/7.3
[51] Int. Cl.[2] .................................. G01C 3/08
[58] Field of Search ............. 356/4, 5; 343/17.1 PF, 343/17.2 R, 7.3

[56] References Cited
UNITED STATES PATENTS

| | | | |
|---|---|---|---|
| 3,456,257 | 7/1969 | Aker | 343/7.3 |
| 3,619,058 | 11/1971 | Hewlett et al. | 356/5 |
| 3,652,161 | 3/1972 | Ross | 356/5 |
| 3,779,645 | 12/1973 | Nakazawa et al. | 356/5 |
| 3,815,133 | 6/1974 | Yasusaka et al. | 343/17.1 PF |
| 3,830,567 | 8/1974 | Riegl | 356/5 |

Primary Examiner—T. H. Tubbesing
Assistant Examiner—S. C. Buczinski
Attorney, Agent, or Firm—Joseph S. Iandiorio

[57] ABSTRACT

An interval measuring system comprising a clock circuit for periodically furnishing clock pulses; an interval generator for periodically generating a gating signal for defining the interval to be measured; a random trigger generator for randomly shifting the gating signals and the clock pulses relative to each other; a counter; an interval gating circuit responsive to the gating signal to pass the clock pulses to the counter during the period of the gating signal representing the interval to be measured; and a control circuit for controlling the counter to accumulate counts for a predetermined number of gating signals; in which the gating signals are subject to similar conditions throughout the system.

18 Claims, 14 Drawing Figures

ELECTRONIC RANGE FINDER

FIELD OF INVENTION

This invention relates to a vernier system for measuring an interval which uses repetitive random shifting to obtain increased accuracy and resolution. The invention further relates to an interval measuring system, whether or not including a vernier mechanism, for independently increasing accuracy and resolution by subjecting the interval defining signals to like conditions throughout the system.

BACKGROUND OF INVENTION

Conventional electronic interval measuring devices, typically accomplish the measurement by counting pulses, such as from a clock pulse source, during the interval to be measured. Their accuracy is, therefore, a function of the counting rate: at a higher counting rate more pulses will be counted during a given interval providing higher resolution and greater accuracy. In certain applications such as electronic range finders used in surveying, accuracy within 0.01 feet is desirable. However, with conventional systems using some form of radiation as the measuring device a resolution of 0.01 feet corresponds to a time of approximately 20 picoseconds. Conventional equipment is typically not capable of reliably counting in such frequency ranges. Furthermore variations in system components from moment to moment even with environmetal stabilization and reliable equipment requires a tolerance of more than 20 picoseconds; pulse rise times have variations of 20 picoseconds or more even in reliable circuits. The first of these considerations, the high counting rate requirements, has inspired a number of different approaches. In one approach gating pulses defining the interval to be measured are staggered with respect to the clock pulses so that the gating interval occurs successively earlier (or later) each time within the period between a pair of clock pulses. This is accomplished by using a drive frequency which is different than the clock frequency so that the gating pulses slip a predetermined constant amount each operation. Such an approach requires highly precise components and adjustments and could tend to be less than desirably stable. In addition precise adjustment for ambient operating conditions is difficult.

SUMMARY OF INVENTION

It is therefore an object of this invention to provide an improved, simpler, less expensive highly reliable and extremely accurate vernier electronic interval measuring system.

It is a further object of this invention to provide such a system which provides extremely high accuracy, in excess of that produceable by the counter mechanism alone, without the requirement for precise phase shifting apparatus and techniques.

It is a further object of this invention to provide such a system which provides increased accuracy and resolution by subjecting all the interval defining signals to the same circuit path.

It is a further object of this invention to provide such an accurate system capable of precise adjustment for ambient operating conditions of temperature and pressure.

The invention results from the realization that a controllable variable delay device such as a random trigger generator can be used to establish an adequate distribution of delay times within a clock period to vary the delay between the clock pulses and interval gating signals, and that an automatic gain control can be used to stabilize the input signal over a wide range of variations in combination with an attenuator level control for establishing a second input signal similar to the first and stabilized with respect to it to provide precisely defined gating intervals.

The invention features an electronic interval measuring system which may function as a range measuring system comprising a transmitter unit for generating a first pulse of radiation and transmitting it to a target whose range is to be determined and a receiver unit for receiving the reflection of the first pulse of radiation to produce a reflected signal pulse and for receiving a second pulse of radiation derived from the first pulse of radiation as it is transmitted to produce a transmitted signal pulse. There is a clock pulse source and a range determining circuit responsive to the signal pulses, to count, during the interval defined by the signal pulses, clock pulses from the clock pulse source as a representation of the range of the target. A random trigger generator randomly shifts the clock pulses and the signal pulses relative to each other.

DISCLOSURE OF PREFERRED EMBODIMENT

Other objects, features and advantages will occur from the following description of a preferred embodiment and the accompanying drawings, in which.

Figure 1:
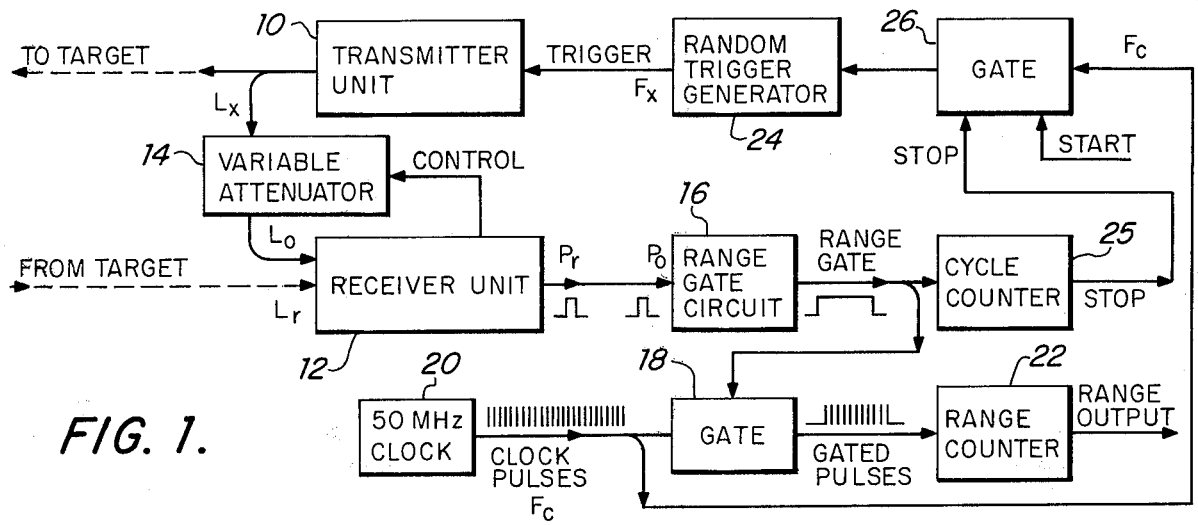
FIG. 1 is a schematic, block diagram of an electronic range finder system according to this invention.
Figure 4:
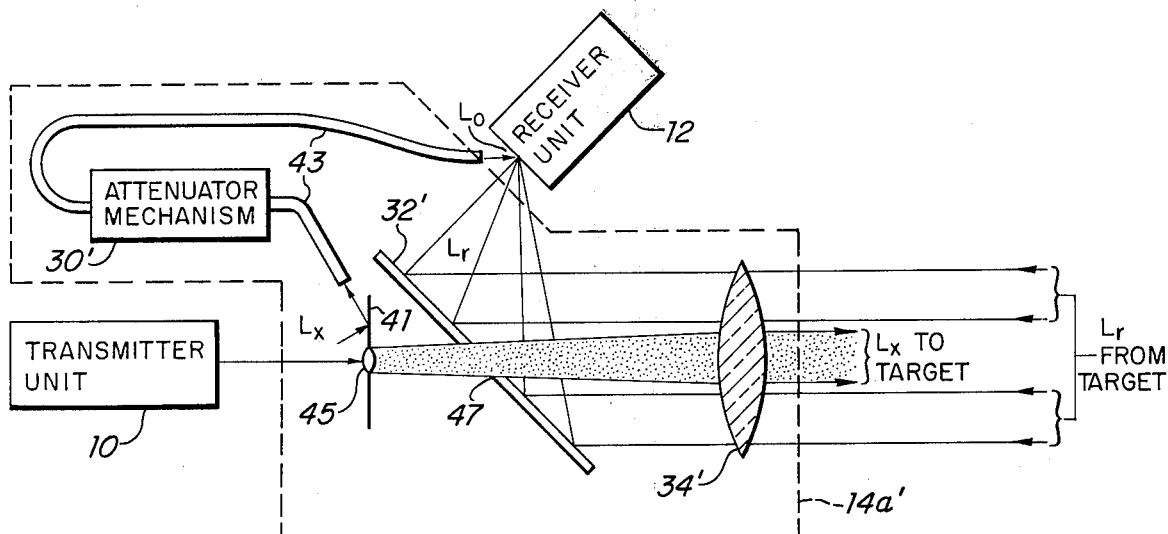
FIG. 4 is a schematic diagram of another form of variable attenuator which may be used in the electronic range finder system of FIG. 1.
Figure 6:
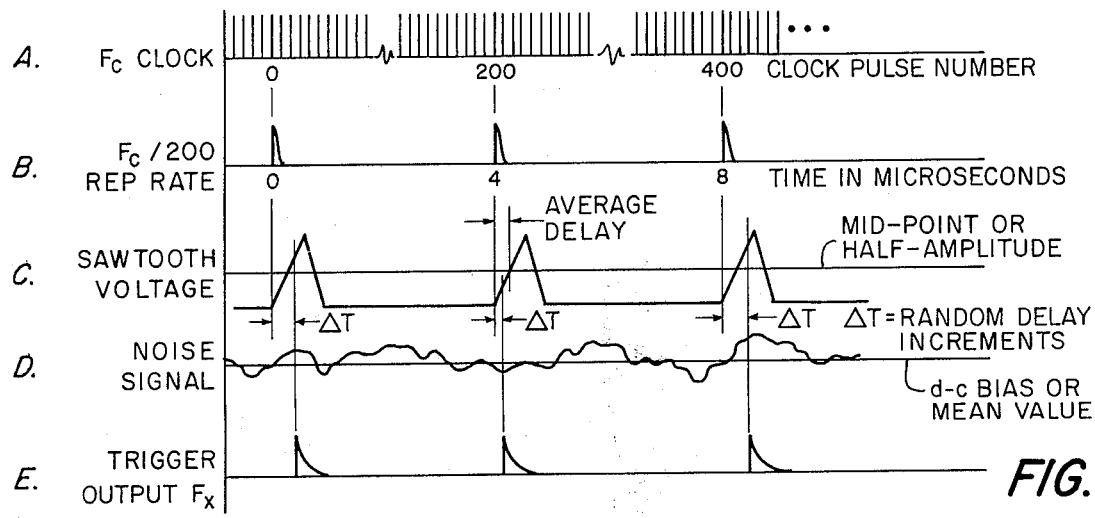
Figure 7:
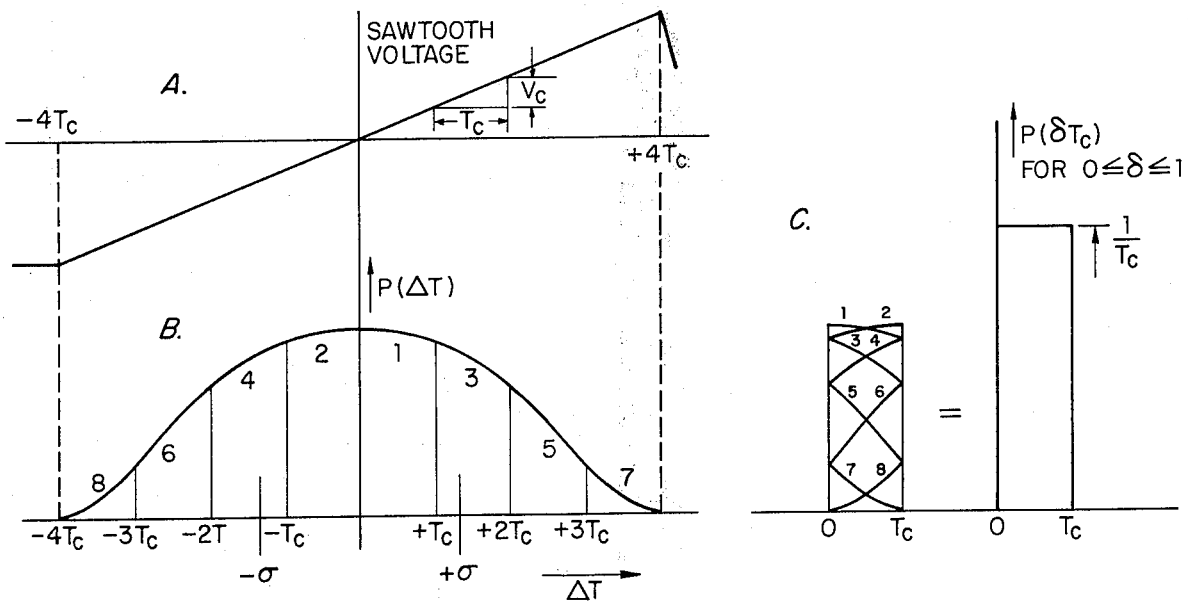

FIGS. 6 A–E is a timing diagram showing the relationship between various signals in the systems of FIGS. 1 and 4; and FIGS. 7 A–D illustrates relationships concerning the probability density function for a gaussion distribution of noise amplitude.

There is shown in FIG. 1 a transmitter unit 10 which generates a pulse of radiation $L_x$ which is directed to a target and reflected from the target to receiver unit 12 where it appears as reflected radiation pulse $L_r$. Radiation pulse $L_x$ is simultaneously directed to a variable attenuator 14 which creates radiation pulse $L_o$ having the same amplitude at receiver unit 12 as the reflected radiation pulse $L_r$. Receiver unit 12 creates two counterpart electrical signal $P_o$ and $P_r$ in response to the receipt of radiation pulses $L_o$ and $L_r$, respectively. The interval between pulses $P_o$ and $P_r$ represents the period between the time radiation pulse $L_x$ left transmitter unit 10 and the time radiation pulse $L_r$ arrived at receiver unit 12. Range gate circuit 16 responsive to signals $P_o$ and $P_r$ creates a range gate signal having a duration equal to the time between $P_o$ and $P_r$; gate 18 is responsive to that range gate signal to pass pulses $F_c$ from the 50 MHz clock pulse source 20 to the range counter 22. The count accumulated in the range counter 22 represents the distance from the transmitter unit 10 to the target and back to receiver unit 12. Since clock pulse source 20 operates at 50 MHz the period between each pair of clock pulses represents a resolution of twenty feet and since the total distance from transmitter unit 10 to the target and back to receiver 12 is twice the distance to the target the resolution with respect to the target is ten feet. This resolution level is that expected when using such components. A repetition of the operation i.e. the creation of additional radiation pulses $L_x$ resulting in additional pairs of signal pulses $P_o$ and $P_r$ accumulates higher and higher counts in range counter 22 but provides the same resolution. The additional cycles of operation do, however, serve to average out any errors which might have been introduced into the measurement.

However, this invention seeks to provide a resolution of 0.01 feet, which is 1,000 times greater than that which can be provided using the 50 MHz clock pulse source 20 and related circuitry. This is accomplished by providing the clock pulses $F_c$ from clock 20 to a random trigger generator 24 through gate 26 which is enabled by an external start signal on the initial actuation of the system. Random trigger generator 24 then generates trigger pulses $F_x$ at an average frequency which is a submultiple of the clock frequency e.g. 250 KHz. These trigger pulses occur at random times evenly distributed during the period of a clock pulse so that the radiation pulse $L_x$ from transmitter unit 10 occurs at random times during the period of a clock pulse from cycle to cycle. This causes radiation pulses $L_o$ and $L_r$ and thus signal pulses $P_o$ and $P_r$ to shift with relation to the clock pulses $F_c$ from cycle to cycle. This random trigger occurrence effectively divides up the period of the clock pulse in a vernier manner so that, after 1,000,000 cycles of operation the distribution of starting times of the range gate signal with respect to the period of the clock pulses $F_c$ is sufficient to provide a resolution of 0.01 feet when the total number of clock pulses accumulated in range counter 22 is divided by the total number of cycles i.e. 1,000,000 accumulated in cycle counter 25. At that point a stop signal from cycle counter 25 stops gate 26 from forwarding clock pulses $F_c$ to random trigger generator 24.

Figure 2:
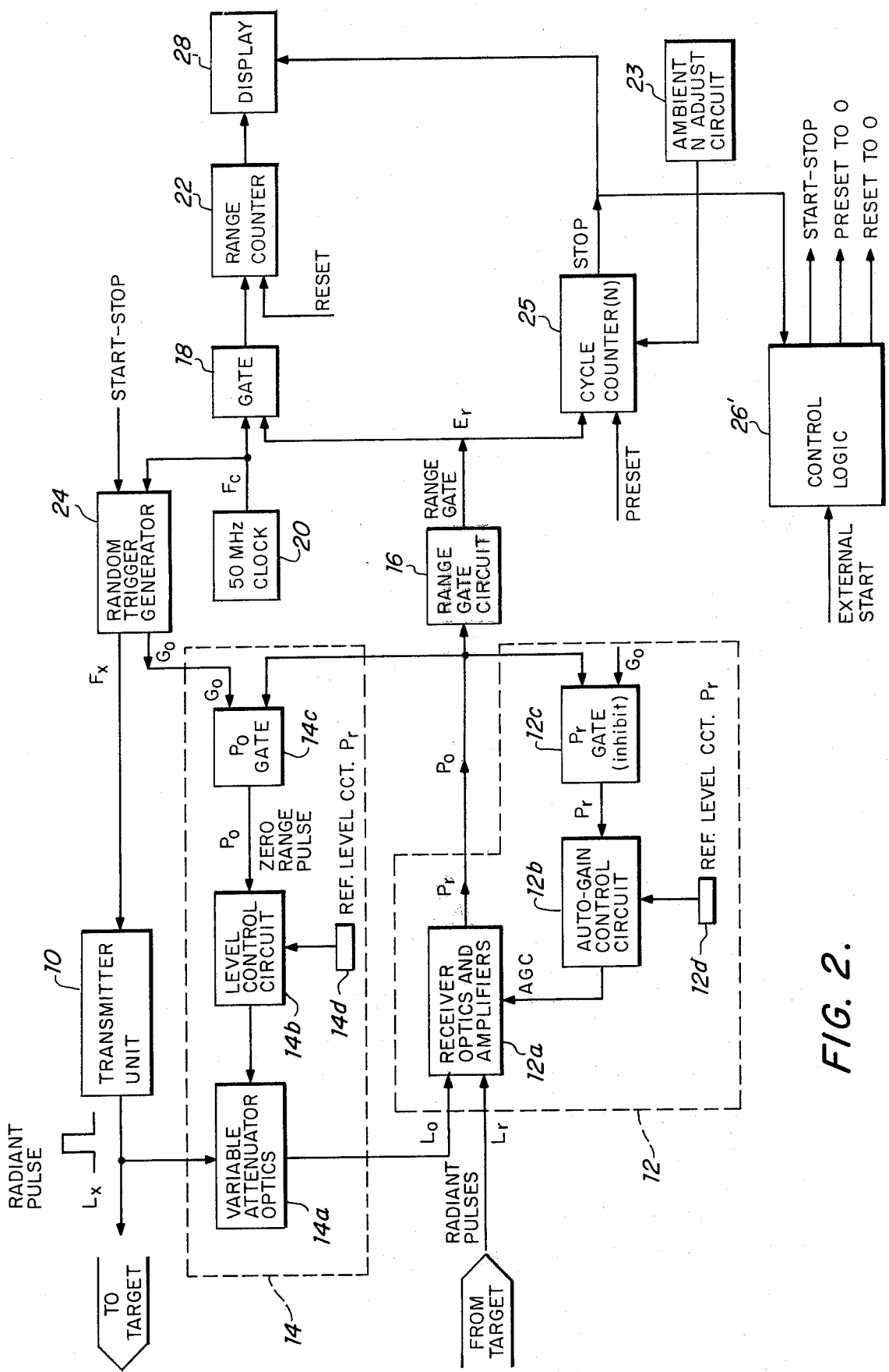
FIG. 2 is a more detailed schematic block diagram of an electronic range finder system according to FIG. 1.

The electronic range finder system of FIG. 1 is shown in more detail in FIG. 2 where like parts have been given like numbers. Variable attenuator 14 there includes variable attenuator optics 14a, level control circuit 14b, and gate 14c. Receiver unit 12 includes receiver optics and amplifiers 12a, automatic gain control circuit 12b and gate 12c.

Gate 14c receives an enabling signal $G_o$ from random trigger generator 24 at the same time that generator 24 emits trigger signal $F_x$. When trigger signal $F_x$ appears, transmitter unit 10 produces radiation pulse $L_x$ which is immediately processed by variable attenuator 14 to provide radiation pulse $L_o$ at the input of receiver unit 12. Thus when signal $G_o$ is present at gate 14c, signal pulse $P_o$ is also present at the input of gate 14c and is passed directly to the level control circuit 14b. Conversely, enabling signal $G_o$ is used at this time to inhibit gate 12c from passing signal pulse $P_o$. Between occurrences of the trigger pulse $F_x$, when the enabling signal $G_o$ is not present, gate 14c will be disabled but gate 12c will no longer be inhibited and will pass the signal pulse $P_r$ to automatic gain control circuit 12b. Signal pulse $P_r$ is compared in automatic gain control circuit 12b with a reference level to stabilize the amplitude of signal pulse $P_r$ through the AGC feedback to the receiver optics and amplifiers 12a.

Similarly, signal pulse $P_o$ is compared by level control circuit 14b with the same or similar reference level as provided to automatic gain control circuit 12b and a level control signal is provided to the variable attenuator optics 14a to attenuate more or less, the radiation pulse $L_x$ to maintain radiation pulse $L_o$ equal in amplitude to radiation pulse $L_r$. In this manner signal pulse $P_r$ representing the time that the radiant pulse $L_r$ arrived at the receiver after being reflected from the target is made uniform in amplitude, and signal pulse $P_o$ is made equal in amplitude to signal $P_r$ through the controllable attenuation exercised by variable attenuator optics 14a on radiant pulse $L_o$. Reference level circuits 14d and 12d may be manually adjustable potentiometers or more sophisticated control devices. The identical treatment of $L_o$ and $L_r$ to create $P_o$ and $P_r$ ensures not only equality in amplitude of the pulses but in their dynamic characteristics such as transient delay and leading edge slopes which are important considerations when defining an interval to be measured with the high resolution achieved by this system.

In FIG. 2 gate 26 has been eliminated and been replaced by control logic 26' which responds to the same external starting signal to produce a start signal to random generator 24 and responds to a stop signal from cycle counter 25 to provide a stop signal to random trigger generator 24. In addition control logic 26' responds to the external start to provide a reset to zero signal to range counter 22 and a preset to N signal to cycle counter 25. A display 28 has also been added in FIG. 2. Display 28 accepts the count in range counter 22.

An advantage of this noise modulation technique is the provision of an exact adjustment of the system scale factor relating actual range to actual displayed count. The clock frequency of 50 megacycles yields a range increment of 10 feet only with the velocity of light assumed at $10^9$ feet-per-second. The actual velocity is somewhat lower and varies with the air temperature and barometric pressure up to about $\pm100$ parts per million. Because this is strictly a fine adjustment of scale factor, it can be accomplished by presetting the cycle counter to values slightly different from the nominal one-million, using measurements of air pressure and temperature without significantly effecting the resolution. Such an adjustment is not easily available with the steady-state phase shift vernier technique.

Thus this system may be adjusted for variations in ambient operating conditions such as atmospheric temperature and pressure by adjusting either automatically or manually the value N in cycle counter 25 using ambient N adjust circuit 23.

Figure 3:
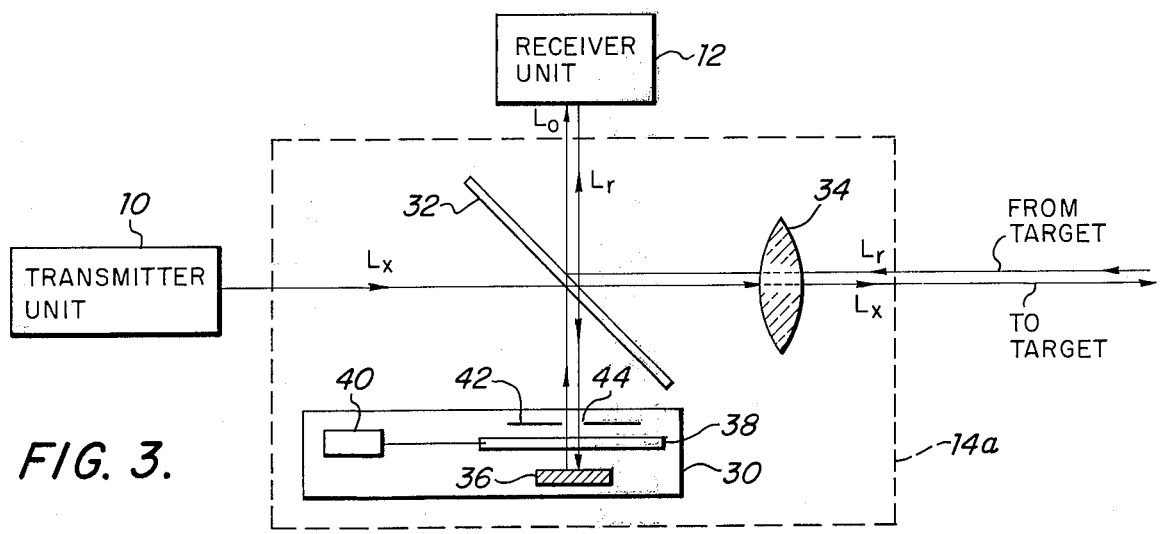
FIG. 3 is a schematic diagram of one form of variable attenuator which may be used in the electronic range finder system of FIG. 1.

In one construction variable attenuator optics 14a may include the attenuator mechanism 30, FIG. 3, a beam splitter mirror 32, and a lens or lens system represented by a single lens 34. Attenuator mechanism 30 includes a mirror 36, a variable density filter 38 and a servomechanism 40 for moving filter 38 to and fro. A mask 42 having a slit 44 is also provided to limit the light entering attenuator mechanism 30.

In operation transmitter unit 10 provides radiation pulse $L_x$ which passes through beam splitter mirror 32 and is directed by the lens 34 to the target. Reflected radiation pulse $L_r$ returning from the target is reflected from the front surface of beam splitter mirror 32 to the input of receiver unit 12. Simultaneously with the passing of radiation pulse $L_x$ through beam splitter mirror 32 a portion of radiation pulse $L_x$ is reflected from the rear side of beam splitter mirror 32 through slit 44 and variable density filter 38 onto mirror 36 whereupon it is reflected and passed a second time through variable density filter 30, slit 44 and beam splitter mirror 32 and arrives at the input of receiver unit 12 as radiation pulse $L_o$. The movement of density filter 38 which places a more dense or less dense portion of filter 38 in the path of radiation $L_o$ and $L_x$ is derived from servomechanism 40 which is actuated by the output of level control circuit 14B, FIG. 2.

Alternatively, variable density filter 38 and servomechanism 40 may be replaced by a liquid crystal which can be driven directly electrically to increase or decrease the attenuation of the radiation passing through it or reflected by it. Other devices may be used in place of attenuator mechanism 30 without departing from the invention.

In applications in which the electronic range finder system is to be used over very long ranges and/or where the reflected radiation pulse is expected to be at a low level an alternative configuration, such as shown in FIG. 4, may be used where like parts have been given like numbers and similar parts have been given like numbers primed with respect to FIGS. 2 and 3. Radiation pulse $L_x$ emitted from transmitter unit 10 is reflected from mirror 41 through fiberoptics 43 and attenuator mechanism 30' to receiver unit 12 as radiation pulse $L_o$. Simultaneously, radiation pulse $L_x$ is directed through lens 45, aperture 47 in central portion of mirror 32' and lens 34' to the target. Reflected radiation pulse $L_r$ returns from the target through lens 34' and is reflected off the annular surface of mirror 32' to arrive at receiver unit 12. With this arrangement spurious low level reflections are prevented from entering attenuator mechanism 30' and interfering with the generation of radiation pulse $L_o$.

Figure 5:
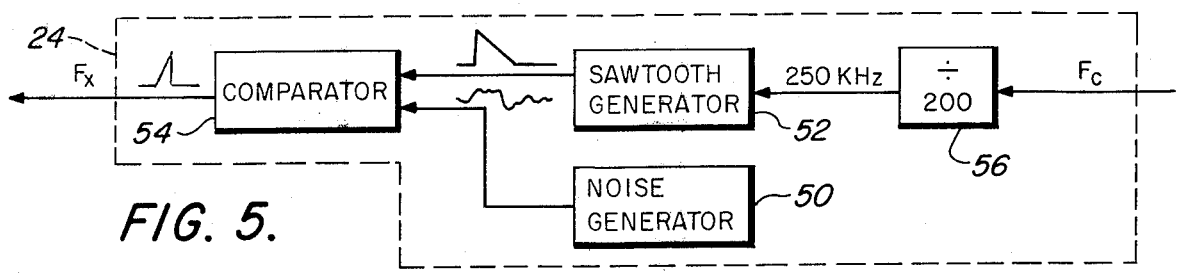
FIG. 5 is a schematic block diagram of one form of variable trigger generator which may be used in the systems of FIGS. 1 and 4.

Another feature of the invention relates to random trigger generator 24, FIGS. 1 and 2, shown in more detail in FIG. 5, and including a noise generator 50, sawtooth generator 52 and comparator 54. Comparator 54 responds to an amplitude coincidence between the noise signal and sawtooth signal to provide trigger pulse $F_x$. Sawtooth generator 52 is made to provide a sawtooth voltage at a frequency of 250 KHz through the use of divider 56 which divides 50 MHz clock signal $F_c$ by a factor of 200.

The timing diagram, FIG. 6, illustrates that the 50 MHz clock signals $F_c$ at A when divided by a factor of 200 produces pulses B at 250 KHz. The spectrum of noise signal D is limited so that it moves slowly relative to the sawtooth signal C but with no significant correlation between successive samples at the clock submultiple repetition frequency e.g. 250 KHz. The standard deviation of the noise signal is set to a small fraction of the total sawtooth voltage excursion. The DC bias or mean value of the noise signal is made equal to the mid point or half amplitude point of the sawtooth voltage. A convenient value for both of these means may be zero volts as shown in FIG. 6C and D. Thus there is an average delay corresponding to the midpoint instant of the sawtooth wave about which the trigger signal exhibits symmetrical plus or minus excursions. Each trigger pulse of trigger output E occurs when the level of the sawtooth voltage exceeds the level of the noise voltage. As can be seen from viewing the three trigger pulses in FIG. 6E the time after the start of each sawtooth $\Delta t$ at which the trigger pulse is generated varies from sawtooth to sawtooth to provide random delay increments in the production of the trigger pulses $F_x$. Noise generator 50 may use a Gaussian noise generator such as a noise generating diode for example a Solitron Devices Inc. SD-20 in conjunction with a broad band high gain amplifier such as a Motorola MC1590G.

The statistical distribution of delay intervals can be made extremely uniform over the basic clock interval even though the noise voltage itself is gaussian. An understanding of this may be gained by reference to FIG. 7A, B, C and D.

FIG. 7B illustrates a classical probability density function with gaussian distribution of the noise amplitude. The sawtooth function, FIG. 7A, has a slope which can be expressed in volts per time unit, or more specifically in volts per clock period, $T_c$. For the present case, a 50 megacycle clock results in a period $T_c$ equal to 0.02 microseconds, and the sawtooth duration is set to about eight clock periods. This can be thought of as an average delay of $4T_c$, with an excursion from $-4T_c$ to $+4T_c$ about the average. The sawtooth voltage increment corresponding to one clock period is designated $V_c$ and is set by circuit considerations. The amplitude of the noise is defined by its standard deviation, $\sigma$, and for the present case the noise and sawtooth signals are related by:

$$V_c = k\sigma, \text{ where } k \leq 1.0$$

The value of $k$ is a design consideration, and is shown at about 0.7 in FIG. 7B.

The gaussian probability density function, FIG. 7B, is divided into segments corresponding to delay time intervals in increments of $T_c$. Most of the noise-generated delays will be within $\pm 2T_c$ or $\pm 1.43\sigma$ and will correspond to about 85% of all of the delay samples. The additional 15% will have greater excursions with correspondingly lower probabilities. In this system a particular trigger may be delayed by a fractional part of the clock interval, e.g. $\delta T_c$, or an integral number of clock periods plus a fractional part. Thus a delay of $2T_c + \delta T_c$ or $-3T_c + \delta T_c$, or $\delta T_c$, all provide the same result. Consequently the probability density function for the distribution of fractional delays ranges between O and $T_c$ and is represented by the super-position of the numbered segments of the gaussian curve FIG. 7B, as shown in FIG. 7C. Each individual segment is a probability density function for the delay interval O to $T_c$, going from left to right. The result of adding all of these segments results in an extremely uniform probability density function for the resulting delay samples. Thus the single trial probability that a delay will be between O and $\delta T_c$, shown in FIG. 7D may be stated as follows:

$$\text{Area } A = \delta = P(0 \leq \Delta T \leq \delta T_c)$$

$$\text{Total Area} = T_c \times \frac{1}{T_c} = 1.0.$$

This uniform distribution of delays enables this system to divide the clock pulse interval into a thousand or more parts using a vernier approach to obtain a resolution much in excess of that ordinarily obtainable with only the counting circuits and other circuits used in the system. The uniform distribution of the delays is not critically dependent upon the exact slope of the sawtooth or the exact value of the standard deviation of the noise. However, the total excursion of the sawtooth should correspond to a wide range of noise amplitudes in order to ensure adequate uniformity in the resulting delay distribution function.

The capability of this noise modulation vernier technique to interpolate the basic clock interval can be specified quantitatively. For any specific range to be measured, the range gate length will be an integral number of clock periods, plus a residual fraction of a period. The range pulses counted during individual gate periods will be that integral number plus an occasional pulse depending upon the extra length of the residual fractional period. Thus if the clock period $T_c$ corresponds to a 10 foot increment in range, an additional range of 3 feet will increase the range gate by $0.3T_c$. With a uniform distribution of random delays, the probability of counting an additional pulse in any one gate period would be 0.3, or 30%, in this example. For a million successive range gates, the probable value for the total of these extra counts is 300,000, which scales down to an extra 3.00000 feet exactly. Statistically, however, it is very unlikely for any one run of a million cycles to yield this exact value. If the million-cycle run were repeated many times, the resulting total residual counts would show a spread of values about the mean value of 300,000, and this spread would be very nearly gaussian. The standard deviation of the resulting spread depends upon the single trial probability p and the number of repetitions N of the trial:

$$\sigma_R = R_c \times \sqrt{\frac{p(1-p)}{N}} \text{ where } R_c = \text{range increment due to clock period } T_c$$

$$= 10' \times \sqrt{\frac{.3(-.3)}{10^6}}$$

$$= .0046 \text{ feet}$$

Thus the vernier interpolation technique would show residual range values between 3.0046 feet and 2.9954 feet for 68% of the runs. A more practical specification of performance is the spread that contains 95% of the runs, called the 95% confidence limits, which amounts to 1.96 $\sigma_R$, or ±0.009 feet for this example. From the above formula, it is seen that a worst case is where $P$ = 0.5, or the residual range is 5.0 feet. Here the 95% confidence limit becomes just under ± 0.01 feet.

Standard electronic components may be used to construct the system shown in FIG. 2 as follows: Transmitter unit 10, G.E. light emitting diode type SSL-54; receiver 12 including receiver optics and amplifiers with AGC, Texas Instruments module TIXL-74; range gate circuit 16, Integrated Circuit Gate type ECL1661; other gates, decade counters dividers, are combinations of standard ECL, TTL, and/or COSMOS digital IC components. The noise generator 50 can be a diode source Solitron Type SD-20 plus an I.C. wideband amplifier type MC1590 with R-C filters and the comparator 54 can be a Signetics SN529.

Other embodiments will occur to those skilled in the art and are within the following claims.

What is claimed is:

1. A high resolution electronic range finder comprising:

a transmitter unit for generating a first pulse of radiation and transmitting it to a target whose range is to be determined;

a single channel receiver unit for receiving said first pulse of radiation after it is reflected from the target and producing a counterpart first signal pulse;

an automatic gain control unit, responsive to said first signal pulse, for providing a control signal to said receiver unit to maintain said first signal pulse at a predetermined reference level;

a variable attenuation system responsive to said first pulse of radiation at said transmitter unit for producing a second pulse of radiation having the same level that said first pulse of radiation has at said receiving unit; said receiver in response to said second pulse of radiation producing a counterpart second signal pulse;

a clock pulse source;

a range determining circuit responsive to said first and second signal pulses to count, during the interval defined by said first and second signal pulses, clock pulses from said clock pulse source as a representation of the range to the target; and a trigger generator for providing a trigger signal to said transmitter unit to enable it to generate said first pulse of radiation, said trigger signal having a frequency which is a sub-multiple of the frequency of said clock pulse source.

2. The electronic range finder of claim 1 in which said variable attenuator unit includes a level control circuit, responsive to said second signal pulse from said receiver unit, for controlling the level of attenuation of subsequent second pulses of radiation.

3. The electronic range finder of claim 1 in which said range determining circuit includes a range gate generator responsive to said first and second signal pulses to produce a range gate signal.

4. The electronic range finder of claim 3 in which said range determining circuit further includes a range counter for counting the number of clock pulses.

5. The electronic range finder of claim 4 in which said range determining circuit further includes a range counter gate, responsive to said range gate signal to pass, during said range gate signal, clock pulses from said clock pulse source to said range counter to be counted as a representation of the range to the target.

6. The electronic range finder of claim 1 in which said trigger generator includes a noise generator, a reference signal source, and a comparator, responsive to the noise signal from said noise generator attaining a predetermined level relative to the reference signal from said reference signal source, to produce a trigger signal.

7. The electronic range finder of claim 6 in which said reference signal source includes a divider circuit responsive to said clock pulse source for producing an intermediate signal at a reduced frequency and a sawtooth generator responsive to said intermediate signal to produce said reference signal.

8. An interval measuring system comprising:

a clock circuit for periodically furnishing clock pulses;

an interval generator for periodically initiating a gating signal defining the interval to be measured;

a random trigger generator for randomly shifting the gating signals with an even distribution during the period of a clock pulse;

a counter;

an interval gating circuit responsive to said gating signal to pass said clock pulses to said counter during the period of said gating signal representing the interval to be measured;

a control circuit for controlling said counter to accumulate counts for a predetermined number of gating signals.

9. The interval measuring system of claim 8 in which said interval generator includes a transmitter unit for generating a first pulse of radiation and transmitting it to a target and a receiver unit for receiving said first pulse of radiation after it is reflected from the target and producing a counterpart first signal pulse and for receiving a second pulse of radiation derived from said first pulse of radiation as it is transmitted for producing a counterpart second signal pulse.

10. The interval measuring system of claim 8 in which said random trigger generator includes a noise generator, a reference signal source, and a comparator, responsive to the noise signal from said noise generator attaining a predetermined level relative to the reference signal from said reference signal source, for producing a trigger signal.

11. The interval measuring system of claim 10 in which said reference signal source includes a divider circuit responsive to said clock pulses for producing an intermediate signal at a reduced frequency and a sawtooth generator responsive to said intermediate signal to produce said reference signal.

12. The interval measuring system of claim 8 further including an automatic gain control circuit responsive to said first signal pulse and a reference circuit for maintaining said first signal pulse at said reference level.

13. The interval measuring system of claim 9 further including variable attenuator system responsive to said second pulse of radiation and said second signal pulse for maintaining said second pulse of radiation at the same level as said first pulse of radiation at said receiver unit.

14. An electronic range measuring system comprising:

a transmitter unit for generating a first pulse of radiation and transmitting it to a target whose range is to be determined;

a receiver unit for receiving said first pulse of radiation to produce a reflected signal pulse and for receiving a second pulse of radiation derived from said first pulse of radiation as it is transmitted to produce a transmitted signal pulse;

a clock pulse source;

a range determining circuit, responsive to said signal pulses to count, during the interval defined by said signal pulses, clock pulses from said clock pulse source as a representation of the range to the target; and a random trigger generator for randomly shifting successive first pulses of radiation with an even distribution during the period of a clock pulse.

15. The electronic range measuring system of claim 14 in which said random trigger generator includes a noise generator, a reference signal source, and a comparator, responsive to the noise signal from said noise generator attaining a predetermined level relative to the reference signal from said reference signal source, for producing a trigger signal.

16. The electronic range measuring system of claim 15 in which said reference signal source includes a divider circuit responsive to said clock pulses for producing an intermediate signal at a reduced frequency and a sawtooth generator responsive to said intermediate signal to produce said reference signal.

17. The electronic range measuring system of claim 14 further including an automatic gain control circuit responsive to said reflected signal pulse and a reference circuit for maintaining said reflected signal pulse at said reference level.

18. The electronic range measuring system of claim 14 further including a variable attenuator system responsive to said radiation pulse as it is transmitted and said transmitted signal pulse for maintaining said second pulse of radiation at the same level as said first pulse of radiation of said receiver unit.

* * * * *